United States Patent
Bell et al.

(10) Patent No.: US 9,121,648 B2
(45) Date of Patent: Sep. 1, 2015

(54) CONTINUOUS PROCESS FOR PROVIDING SUPERHEATED LIQUID TO A VESSEL

(71) Applicant: E I DU PONT DE NEMOURS AND COMPANY, Wilmington, DE (US)

(72) Inventors: David S. Bell, Mechanicsville, VA (US); Jorge J. Castro Velez, Bear, DE (US); Robert K. Cox, Landenberg, PA (US); Donald Hugh Marlow, Midlothian, VA (US); Charles A. Orrock, North Chesterfield, VA (US); Ronald William Pagano, Midlothian, VA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 49 days.

(21) Appl. No.: 14/195,987

(22) Filed: Mar. 4, 2014

(65) Prior Publication Data
US 2014/0262154 A1 Sep. 18, 2014

Related U.S. Application Data

(60) Provisional application No. 61/776,960, filed on Mar. 12, 2013.

(51) Int. Cl.
| F22G 1/16 | (2006.01) |
| F28F 27/02 | (2006.01) |
| B01D 1/00 | (2006.01) |
| B01D 3/32 | (2006.01) |
| B01D 3/42 | (2006.01) |

(52) U.S. Cl.
CPC .............. *F28F 27/02* (2013.01); *B01D 1/0094* (2013.01); *B01D 3/322* (2013.01); *B01D 3/4283* (2013.01)

(58) Field of Classification Search
USPC ................ 122/406.1, 414, 448.3, 467, 479.6; 165/101, 103
See application file for complete search history.

(56) References Cited

U.S. PATENT DOCUMENTS 2,643,520 A * 6/1953 Powell, Jr. ...................... 60/662
3,017,870 A * 1/1962 Profos .......................... 122/479.6

* cited by examiner

*Primary Examiner* — Gregory A Wilson

(57) ABSTRACT

A process for continuously providing superheated liquid to a chemical process vessel by providing a first heating device capable of heating an entire liquid effluent stream from the vessel, the first heating device receiving the entire liquid effluent stream from the vessel and returning a heated liquid stream to the vessel; filling a similar second heating device with liquid from the liquid effluent stream prior to applying any heat to the second heating device; heating and increasing the liquid effluent stream supplied to the second heating device while decreasing the liquid effluent stream provided to the first heating device until the second heating device is receiving and returning all the heated liquid stream to the vessel, while adjusting heat to the devices as needed to maintain the heated liquid below the flash point and maintain the desired total amount of superheated liquid provided to the vessel.

10 Claims, 1 Drawing Sheet

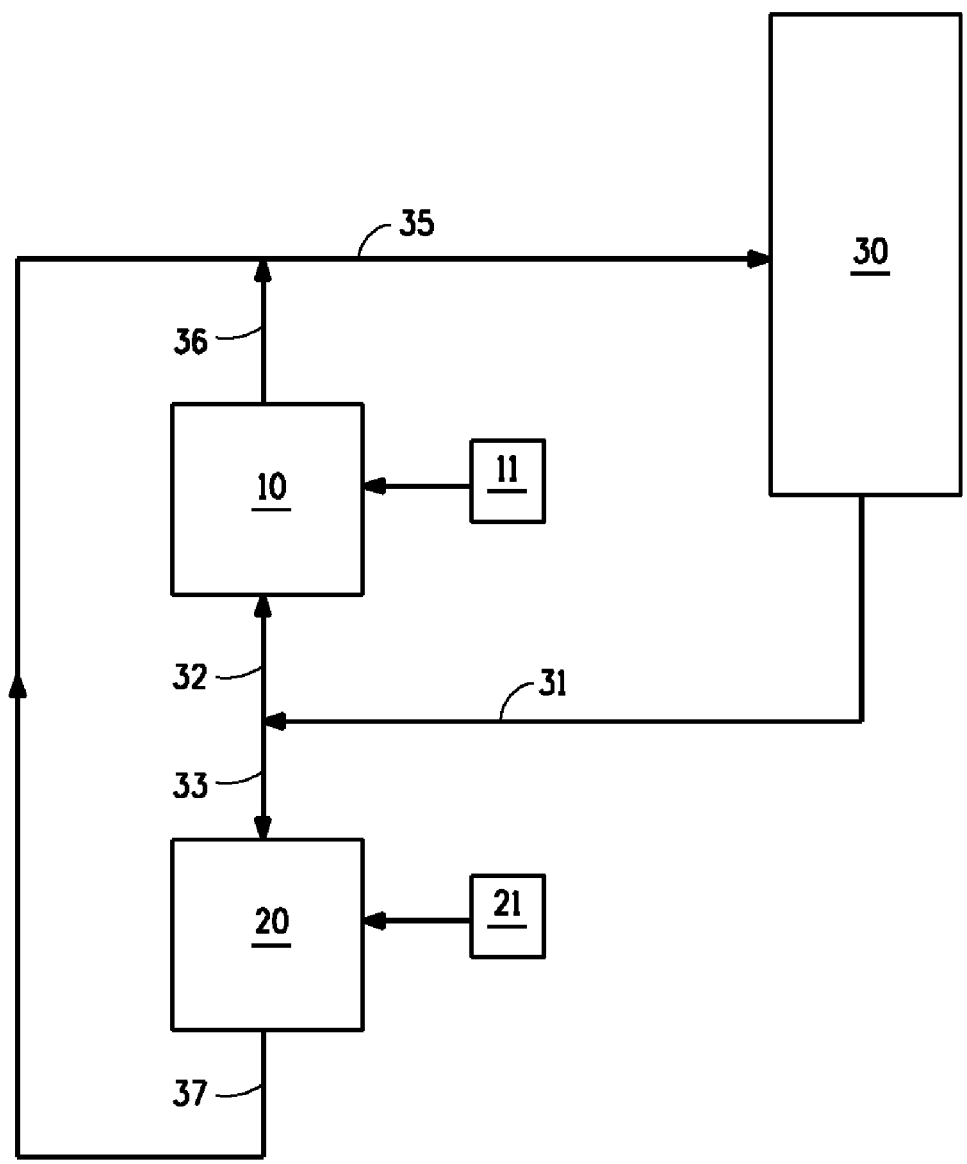

CONTINUOUS PROCESS FOR PROVIDING SUPERHEATED LIQUID TO A VESSEL

BACKGROUND OF THE INVENTION

1. Field of the Invention

This invention relates to a process for providing one or more superheated liquid streams to a vessel by use of heating devices. As used herein, the words "heating device" is meant to include a heat exchanger or a calandria and such words can be used interchangeably. Also, as used herein the word "vessel" or "process vessel" or "chemical process vessel" is meant to include a tower, column (for one example a distillation column), flash drum, vaporizer, or any process equipment that requires a heated liquid stream and such words can be used interchangeably.

2. Description of Related Art

When a liquid process stream is heated with a heating device, with time the process stream can foul the heating device. This requires that the heating device be periodically shut down or taken out of service so that it can be manually cleaned or serviced, meaning that the chemical process associated with heated liquid process stream must also be stopped. However, it is desirable to have a chemical process that continuously provides a heated liquid process stream, one that allows the liquid stream to be switched from a first heating device to a second heating device without having to shut down the entire chemical process.

Providing such a continuous process when the process is superheating a liquid stream has additional challenges, for if the superheated liquid flashes uncontrollably it can damage process equipment. What is needed, therefore, is a continuous process for providing at least one heated liquid stream to a vessel while switching from a first heating device to a second heating device while maintaining the temperature and pressure of the stream to the vessel below a flash point of the liquid, while also maintaining the total amount of superheated liquid provided to the vessel within a desired range necessary for continuous vessel operation without stopping the chemical process or creating other process upsets.

BRIEF SUMMARY OF THE INVENTION

This invention relates to a process for continuously providing superheated liquid to a chemical process vessel, comprising the steps of:

a) providing a first heating device capable of heating an entire liquid effluent stream from the vessel to a temperature within a desired temperature range, the first heating device provided with a first heat source for providing heat, the first heating device connected to and receiving the entire liquid effluent stream from the vessel and subsequently returning a first heated liquid stream to the vessel at a temperature and pressure within a desired range of temperatures and pressures, the first heated liquid stream having an amount of superheated liquid necessary for continuous vessel operation;

b) supplying a portion of the entire liquid effluent stream from the vessel to a second heating device to substantially fill that second heating device with liquid prior to applying any heat to the second heating device, the second heating device provided with a second heat source for providing heat, the second heating device connected to the vessel parallel to the first heating device and capable of receiving and heating the entire liquid effluent stream from the vessel and subsequently returning a second heated liquid stream to the vessel at a temperature and pressure within a desired range of temperatures and pressures, the second liquid stream having the amount of superheated liquid necessary for continuous vessel operation;

c) applying heat to the substantially-filled second heating device from the second heat source to heat the liquid in the second heating device and provide the second heated liquid stream to the vessel while maintaining the temperature and pressure of both the first and second heated liquid streams to the vessel below a flash point of the liquid, and maintaining the total amount of superheated liquid provided to the vessel in the combined first and second heated liquid streams within a desired range necessary for continuous vessel operation; and d) increasing the amount of the entire liquid effluent stream supplied to the second heating device while applying heat to the second heating device from the second heat source, and decreasing the amount of the entire liquid effluent stream provided to the first heating device from the vessel while reducing heat to the first heating device from the first heat source, until the second heating device is receiving the entire liquid effluent stream from the vessel and the second heated liquid stream is returning all the heated liquid stream to the vessel, while maintaining the first and second heated liquid streams below the flash point and maintaining the desired total amount of superheated liquid provided to the vessel.

BRIEF DESCRIPTION OF THE DRAWINGS

The FIGURE is an illustration of one process of this invention.

DETAILED DESCRIPTION OF THE INVENTION

This invention relates to a process for providing at least one superheated liquid stream to a chemical process vessel involving heating devices that are fed by forced circulation. It relates to processes that provide at least one liquid stream, heated by a heating device such as a heat exchanger, and in particular a process that continuously provides at least one heated liquid stream to a vessel while the task of providing the heated liquid is transferred from at least a first heating device to at least a second heating device. This is accomplished while maintaining the total amount of superheated liquid provided to the vessel within a desired range necessary for continuous vessel operation.

By "superheated", it is meant the liquid is heated to a temperature above its boiling point. By "superheated liquid" it is meant a liquid maintained under pressure at temperatures between its boiling point and the critical temperature of the liquid. Many chemical processes require the heating of liquid streams that contain a mixture of very volatile and less volatile liquids (i.e. liquids having lower and higher boiling points) so that the more volatile liquid can be separated from the less volatile liquid in a vessel such as a distillation column. In such cases, it is desirable to superheat the liquid stream above the boiling point of the volatile liquid and then supply that superheated liquid stream to the column, where the more volatile liquid flashes and is separated from the less volatile liquid. In one process, this requires continuously taking a liquid effluent stream from the bottom of a vessel or column, superheating that liquid stream, returning that heated liquid stream back to the column, and then flashing the superheated stream at a point in the column. The pressure and temperature of the liquid stream during the heating and return to the column is highly controlled, because if the liquid flashes prematurely in the piping or the heating device, damage to the equipment could result.

Previously, if the heating device fouled or needed maintenance, the entire chemical process would be shut down, the heating device manually cleaned and/or serviced, and the process restarted. The inventors have found that a process can be achieved that allows for shutdown of a heating device for cleaning while the process continuously provides a superheated liquid to a vessel in a condition suitable for the process. This process is achieved by use of a heating device arrangement having at least a first and a second heating device.

This invention relates to a process for providing at least one heated liquid stream to a chemical process vessel, involving forced circulation (i.e. by pumping) of the liquid through heating devices where the circulation rate through the heating devices and heat input to the heating devices are each independently controllable. Generally the heated liquid stream is provided through one or more pipes connected between the heating devices and the vessel. For example, each heating device can have a separate pipe to the process vessel, or more preferably, each heating device is individually piped or connected to a single header pipe leading to the process vessel. This allows parallel heated liquid streams from a first and second heating device to be combined prior to returning those streams to the vessel. The header or piping containing the at least one heated liquid stream is then preferably provided to the column or vessel at the appropriate stage for the desired process. Control values and control equipment maintain the pressure of the liquid in the piping such that the flashing of any volatile components in the heated liquid stream occur in, or substantially occur in, the process vessel. By "substantially occur in" means that flashing of the superheated liquid occurs close enough to the process vessel to not cause a hydraulic hammer or damage to the equipment.

Likewise, each heating device can receive liquid effluent from the process vessel through one or more pipes, and again preferably each heating device is individually piped or connected to a single effluent pipe header taken from the vessel. The header or piping containing the liquid effluent stream is then preferably taken from the column or vessel at the appropriate stage for the desired separation process; however, this effluent stream is generally taken from the bottom of the column or vessel. While the liquid effluent stream is typically taken from one outlet utilizing one header, the liquid effluent stream can be taken from multiple outlets and/or use multiple pipes.

Individually, both the first and second, and optionally other, heating devices are capable of heating the entire liquid effluent stream from the vessel to a temperature within a desired temperature range to form the heated liquid stream, and capable of supplying that heated liquid stream to the vessel with a desired amount of superheated liquid necessary for continuous vessel operation. The heating devices are provided with first and second, and optionally other, heat sources. The type of heat source is dependent on the desired temperature range, but one convenient heat source is pressurized steam. The steam forming the first and second heat source to the heating devices can be provided from a common header with individual piping to the heating devices, along with valves and control equipment to individually regulate the amount of heat provided to each heating device. While steam may be a convenient heat source, other heat sources, such as electrical, gas, etc. may be used if suitable for the process situation and can be individually controlled for each heating device.

The amount of heat supplied to each heating device can be controlled by measurement of the maximum temperature of the liquid in the device. The maximum allowable temperature in each heating device is the minimum bubble point temperature of the liquid to be heated under all the differing conditions (i.e. pressure) that will be experienced in the device during operation. Generally for countercurrent heating devices, the maximum temperature measured is the liquid exit temperature from the heating device. The minimum bubble point temperature of the liquid in each heating device can be determined from process simulations and from an estimated pressure from a known flow through the device or from a direct pressure measurement on the discharge of the device adjusted for the temperature and pressure in the vessel, or some combination of these or similar techniques. In a preferred embodiment, the amount of heat supplied to each heating device is controlled such that the maximum temperature in the device does not exceed the minimum bubble point temperature of the liquid.

Alternatively, the amount of heat supplied to each heating device can be controlled via other methods. These include forward control using process simulations and/or other techniques to calculate the maximum amount of heat that can be supplied to the liquid without exceeding the liquid bubble point, based on the amount and temperature of the effluent stream to be heated, and then controlling the amount of heat to each heating device, keeping each below the calculated amount needed to reach the liquid bubble point based on the amount and condition of the liquid entering each heating device, while maintaining the total amount of required superheated liquid needed to operate the vessel.

During normal operation at the start of the process, preferably the first heating device is receiving the entire liquid effluent stream from the vessel and returning the entire heated liquid stream to the vessel at a temperature within a desired temperature range, with the heated liquid stream having an amount of superheated liquid necessary for continuous vessel operation, from heat provided by a first heat source. When it is desired to shut down that first heating device and transfer the heat load to a second heating device, a portion of the liquid effluent stream from the vessel is supplied to that second heating device to fill that device with liquid. The filling of the second heating device is preferably accomplished while increasing the entire flow of the liquid effluent from the vessel. This allows the first heating device to continue to operate normally as the second heating device is filled.

The amount of increase of liquid effluent stream taken from the vessel, and the rate at which the second heating device is filled, is preferably selected such that the rate of material flow into and/or out of the vessel is not so excessive as to cause level control upsets in the vessel or cause other process upsets in downstream equipment. In some embodiments it is useful to increase the effluent flow only very little while filling the second heating device, normally less than about 10 percent, or less than 5 percent or lower, with less than 1 percent increase in the effluent flow being preferred. The percentage increase of liquid effluent stream taken from the vessel can be more or less depending on the ratio of the circulation flow to the heating devices to the flows into and out of the process being heated. In some most preferred embodiments, the liquid effluent stream used to fill the second heating device is only fractionally increased about 0.25 to 0.5 percent. In other words, in some embodiments of this process, the second heating device is preferably gradually filled, taking several minutes to an hour or more, depending on the volumetric size of the heating device.

The second heating device is substantially filled with the liquid effluent prior to applying substantial heat to the second heating device from the second heat source. This helps avoid flashing of the liquid effluent in the heating device; contact of the liquid with a hot interior surface in the heating device would cause immediate localized flashing of the liquid effluent.

During the filling of the second heating device with the liquid effluent, the first heating device provides an appropriate amount of heat to the remaining liquid effluent stream to maintain the heated liquid stream returning to the vessel within the desired range of temperature and pressures while also maintaining the total amount of superheated liquid provided to the vessel within a desired range necessary for continuous vessel operation.

Once the second heating device is substantially filled with liquid, heat is initiated from the second heat source and supplied to the second heating device to heat the liquid in the second heating device and provide the second heated liquid stream to the vessel. The temperature and pressure of both the first and second heated liquid streams to the vessel is maintained below a flash point of the liquid while the total amount of superheated liquid provided to the vessel in the combined first and second heated liquid streams is maintained within a desired range necessary for continuous vessel operation. In some transient conditions during the process while both heat devices are online, it is possible for one heating device to provide a superheated liquid stream while the other is providing only a heated liquid stream; however, the difference in temperature or conditions in the two heated liquid streams is not so great as to prevent the combination of both heated liquid streams from the heating devices from providing a superheated liquid stream to the vessel within a desired range necessary for continuous vessel operation. In some preferred embodiments, therefore, the heated liquid streams are combined into a common header to allow for mixing of the streams to ensure the amount of superheated liquid provided to the vessel is within the desired range.

The amount of the liquid effluent stream supplied to the second heating device is then increased, while applying heat to the second heating device from the second heat source; while simultaneously the amount of the entire liquid effluent stream provided to the first heating device from the vessel is decreased, while reducing heat to the first heating device from the first heat source.

That is, once the second heating device is substantially filled with the liquid effluent, heat is then provided to the second heating device from the second heat source to initiate the heating of the liquid stream returning to the vessel. In addition, the relative amount of the liquid effluent stream supplied to the second heating device versus the first heating device is gradually increased while also appropriately increasing the amount of heat provided from the second heat source. Simultaneously, as the relative amount of liquid effluent supplied to the first heating device is reduced, the amount of heat supplied to that device from the first heat source is also reduced.

The process continues, further increasing the portion of the entire liquid effluent stream supplied to the second heating device and further decreasing the remaining amount of the entire liquid effluent stream provided to the first heating device from the vessel, while increasing and/or reducing heat to the devices as needed to maintain the liquid below the flash point and the desired total amount of superheated liquid provided to the vessel, until the second heating device is receiving the entire liquid effluent stream from the vessel and the second heated liquid stream is returning all the heated liquid stream to the vessel.

That is, the amount of liquid effluent heated by the second heating device and the amount of heat applied to the second heating device are increased, while the amounts of liquid effluent heated by the first heating device and the amount of heat applied to the first heating device are decreased until the second heating device is handling the entire heat load for heating the entire effluent stream, using the second heat source and providing the entire heated liquid stream back to the vessel.

In some embodiments, as the second heating device approaches a point where it can handle the entire heat load for providing the entire heated liquid stream back to the vessel, all heat provided to the first heating device from the first heat source is first stopped and then all flows to the first heating device are stopped. The first heating device is physically isolated from the process using valves or other means, and any remaining liquid in the first heating device is emptied to a storage tank. The first heating device is then available for cleaning or maintenance while the process continues to operate normally.

The FIGURE provides one illustration of the process. This process involves providing a first heating device 10 capable of heating a liquid effluent stream from a vessel 30 to a temperature within a desired temperature range and providing the total amount of superheated liquid provided to the vessel within a desired range necessary for continuous vessel operation. The heating device is connected to the vessel to receive a liquid effluent stream 31 from that vessel and subsequently return a heated liquid stream 35 back to the vessel at a temperature and pressure within a desired range of temperature and pressure. Connected to the first heating device 10 is a first heat source 11 that provides heat to the first heating device to heat the liquid effluent stream 31. During normal operation, first heating device 10 is handling the entire liquid effluent stream 31 from the vessel 30 and returning the entire heated liquid stream to the vessel 30; the entire heat load is supplied by first heat source 11.

When it is desired to switch the heat load to a second heating device, the process further involves supplying a portion of the liquid effluent stream 31 to a second heating device 20 to substantially fill that second heating device with liquid prior to applying any heat to the second heating device. As with the first heating device, the second heating device is also connected to the vessel 30 parallel to the first heating device 10. The second heating device is also capable of receiving the liquid effluent stream 31 from the vessel and subsequently returning a heated liquid stream 35 to the vessel at a temperature and pressure within a desired range of temperatures and pressures and providing the total amount of superheated liquid provided to the vessel within a desired range necessary for continuous vessel operation. Further, connected to the second heating device 20 is a second heat source 21 that provides heat to the second heating device to heat the liquid effluent stream 31. As shown in the FIGURE, liquid effluent streams 32 and 33 and suitable valves and control equipment (not shown) are used to connect the liquid effluent stream 31 to the first and second heating devices, respectively. Likewise, heated liquid effluent streams 36 and 37 and suitable valves and control equipment (not shown) are used to connect the first and second heating devices, respectively, to the heated liquid stream 35.

It is advantageous to increase the amount of liquid effluent stream 31 from the vessel during the filling of the second heating device 20. Ideally this increase in effluent stream allows the amount of liquid effluent stream 32 to remain unchanged while the second heating device is being filled.

Once the second heating device is substantially filled with the liquid effluent, the heat duty from the first heating device is then gradually switched to the second heating device without stopping the process or creating process upsets. The temperature and pressure of the heated liquid stream 35 to the vessel is maintained within the desired ranges of temperature and pressure, along with containing the desired total amount of superheated liquid necessary for continuous vessel operation, while continuing to supply the liquid effluent stream 31 to both the first and second heating devices. Using valves and a suitable control equipment, the amount of the liquid effluent stream 33 supplied from liquid effluent steam 31 to the second heating device 20 is increased while an appropriate increased amount of heat is applied to the second heating device from the second heat source 21. Simultaneously, the amount of the liquid effluent stream 32 sent to the first heating device 10 from liquid effluent steam 31 is decreased while reducing an appropriate amount of heat to the first heating device from the first heat source 11.

The amount of the liquid effluent stream 33 supplied to the second heating device is then further increased, while reducing the amount of the liquid effluent stream 32 provided to the first heating device, while maintaining the temperature and pressure of the heated liquid stream 35 to the vessel, while also maintaining the total amount of superheated liquid in heated liquid stream 35 in a range necessary for continuous vessel operation, until the second heating device is receiving all the liquid effluent stream 31 from the vessel and returning all the heated liquid stream 35 to the vessel.

It is advantageous to turn off the first heat source 11 to the first heating device 10 to stop heating that device prior to fully stopping the liquid effluent stream through that device. This allows the heat in the associated equipment to be dispersed and helps prevent localized hot spots that might inadvertently flash the liquid. Further, it is advantageous to reduce back to the normal rate the amount of the liquid effluent stream 31 from the vessel that was raised during the filling and switchover from the first to the second heating device. It has been found useful for the amount of effluent stream 31 to be gradually ramped up during filling of the second heating device, the amount held steady at a flow in excess of the standard effluent flow rate during the switchover, and then the amount be gradually ramped back down to the standard rate as use of the first heating device is reduced or stopped.

In some embodiments, it is helpful to increase the effluent rate supplied from the vessel until the second heating device is handling 25 percent of the heat duty of the heated liquid stream; in some other embodiments the effluent rate supplied from the vessel is increased until the second heating device is handling 50 percent of the heat duty of the heated liquid stream. In some embodiments the amount of the entire liquid effluent supplied to the first heating device is decreased once the second heating device is handling at least 50 percent of the heat duty of the heated liquid stream; in some other embodiments the amount of the entire liquid effluent supplied to the first heating device is decreased once the second heating device is handling at least 75 percent of the heat duty of the heated liquid stream. As used herein, "heat duty of the heated liquid stream" means the total amount of heat transferred to the liquid from the heating devices to the combined first and second heated streams to maintain the desired total amount of superheated liquid in the combined heated liquid stream.

While as represented in the FIGURE the liquid effluent steam 31 and heated liquid stream 35 can preferably be in the form of single header streams having the respective piping 32/33 and 36/37 to accommodate the dual heating devices, other piping arrangements are possible. For example, each heating device can have its own dedicated effluent stream from the vessel and heated liquid stream returning to the vessel with the control system controlling suitable valving to operate the process. Also, while not shown in the FIGURE, a feed stream from another process can be added to the liquid effluent stream 31 as one method of applying a liquid to the vessel.

The heating devices can be any type of device that can supply heat to the liquid effluent stream, and the heat source can be any type or method of supplying heat to the heating device. In some embodiments, the heating devices that exchange heat from one fluid to another are known as shell and tube heat exchangers, spiral heat exchangers, or plate and frame heat exchangers; however, the invention applies to any device capable of adding heat to a process fluid. In some preferred embodiments, the effluent stream is heated in the tubes of a shell and tube heat changer and the heat source is steam that is supplied to the shell side of a shell and tube heat exchanger.

The vessel in some preferred embodiments is a distillation column suitable for separating two or more components. In some preferred embodiments the vessel is designed to receive a multi-component superheated liquid that will flash into more than one phase as the pressure on the liquid is reduced. Generally, the processes described herein include addition of the heated liquid stream to essentially any point in a vessel.

The invention claimed is:

1. A process for continuously providing superheated liquid to a chemical process vessel, comprising the steps of:
 a) providing a first heating device capable of heating an entire liquid effluent stream from the vessel to a temperature within a desired temperature range,
  the first heating device provided with a first heat source for providing heat, the first heating device connected to and receiving the entire liquid effluent stream from the vessel and subsequently returning a first heated liquid stream to the vessel at a temperature and pressure within a desired range of temperatures and pressures, the first heated liquid stream having an amount of superheated liquid necessary for continuous vessel operation;
 b) supplying a portion of the entire liquid effluent stream from the vessel to a second heating device to substantially fill that second heating device with liquid prior to applying any heat to the second heating device,
  the second heating device provided with a second heat source for providing heat, the second heating device connected to the vessel parallel to the first heating device and capable of receiving and heating the entire liquid effluent stream from the vessel and subsequently returning a second heated liquid stream to the vessel at a temperature and pressure within a desired range of temperatures and pressures, the second heated liquid stream having an amount of superheated liquid necessary for continuous vessel operation;
 c) applying heat to the substantially-filled second heating device from the second heat source to heat the liquid in the second heating device and provide the second heated liquid stream to the vessel; while maintaining the temperature and pressure of both the first and second heated liquid streams to the vessel below a flash point of the liquid, and maintaining the total amount of superheated liquid provided to the vessel in the combined first and second heated liquid streams within a desired range necessary for continuous vessel operation; and d) increasing the amount of the entire liquid effluent stream supplied to the second heating device while applying heat to the second heating device from the second heat source, and decreasing the amount of the entire liquid effluent stream provided to the first heating device from the vessel while reducing heat to the first heating device from the first heat source, until the second heating device is receiving the entire liquid effluent stream from the vessel and the second heated liquid stream is returning all the heated liquid stream to the vessel, while maintaining the first and second heated liquid streams below the flash point and maintaining the desired total amount of superheated liquid provided to the vessel.

2. The process of claim 1 wherein the supplying of a portion of the entire liquid effluent stream from the vessel to a second heating device is achieved while increasing the amount of the entire liquid effluent stream taken from the vessel.

3. The process of claim 2 wherein the amount of the entire liquid effluent from the vessel is increased until the second heating device is handling at least 25 percent of the heat duty of the heated liquid stream.

4. The process of claim 2 wherein the amount of the entire liquid effluent from the vessel is increased until the second heating device is handling at least 50 percent of the heat duty of the heated liquid stream.

5. The process of claim 2 wherein the amount of the entire liquid effluent from the vessel is subsequently decreased once the second heating device is handling at least 50 percent of the heat duty of the heated liquid stream.

6. The process of claim 2 wherein the amount of the entire liquid effluent from the vessel is subsequently decreased once the second heating device is handling at least 75 percent of the heat duty of the heated liquid stream.

7. The process of claim 1 wherein the first or second heat source is steam.

8. The process of claim 1 wherein the first and second heated liquid streams are combined prior to returning those streams to the vessel.

9. The process of claim 1 wherein the amount of heat supplied to either the first or second heating device is controlled such that the maximum temperature in the device does not exceed the minimum bubble point temperature of the liquid.

10. The process of claim 1 wherein the amount of heat supplied to either the first or second heating device is controlled below the calculated maximum amount of heat addition needed to reach the bubble point temperature in each heating device, based on the amount and condition of the liquid entering each heating device.

* * * * *